United States Patent [19]
Adams et al.

[11] Patent Number: 6,063,237
[45] Date of Patent: *May 16, 2000

[54] TREATMENT OF SOLID CONTAINING MATERIAL DERIVED FROM EFFLUENT OR WASTE FROM WASTEPAPER TREATING PROCESS

[75] Inventors: John Michael Adams, Truro; Jonathan Stuart Phipps, St Austell, both of United Kingdom

[73] Assignee: ECC International Ltd., United Kingdom

[ * ] Notice: This patent is subject to a terminal disclaimer.

[21] Appl. No.: 08/750,481

[22] PCT Filed: Apr. 11, 1996

[86] PCT No.: PCT/GB96/00884

§ 371 Date: Feb. 27, 1997

§ 102(e) Date: Feb. 27, 1997

[87] PCT Pub. No.: WO96/32354

PCT Pub. Date: Oct. 17, 1996

[30] Foreign Application Priority Data

Apr. 11, 1995 [GB] United Kingdom .................. 9507494

[51] Int. Cl.[7] .................................................. D21C 11/00
[52] U.S. Cl. ........................... 162/29; 162/30.1; 162/189; 162/DIG. 9; 210/928
[58] Field of Search .................................. 162/4, 29, 189, 162/DIG. 9; 210/702, 703, 928

[56] References Cited

U.S. PATENT DOCUMENTS 3,320,076  5/1967  Sutton ........................................ 106/72
4,479,920  10/1984  Dodson .................................... 422/143

FOREIGN PATENT DOCUMENTS

| | | |
|---|---|---|
| 0613867A1 | 9/1994 | European Pat. Off. . |
| 1361402 | 7/1974 | United Kingdom . |
| 2273701 | 6/1994 | United Kingdom . |
| 582023 | 11/1996 | United Kingdom . |
| WO95/18885 | 7/1995 | WIPO . |

*Primary Examiner*—Dean T. Nguyen
*Attorney, Agent, or Firm*—Finnegan, Henderson, Farabow, Garrett and Dunner, L.L.P.

[57] ABSTRACT

A method of treating solid-containing material contained in or produced from an effluent or waste from a process for the treating of waste paper. The solid-containing material includes constituents of the waste paper and organic material including cellulose fibers and inorganic particulate material including calcium carbonate and other inorganic particulate material included in the waste paper. The solid-containing material is subjected to a heat treatment that incinerates the organic material present and forms from the inorganic particulate material present a calcined product including calcium oxide from thermal decomposition of calcium carbonate. The calcined product is formed into an aqueous suspension wherein calcium oxide is converted to calcium hydroxide. The calcined product in the suspension is comminuted and a reagent is added to the suspension to form a salt-forming anionic species to form an insoluble calcium salt precipitate mixed or aggregated with other inorganic particulate material derived from the waste paper constituents.

18 Claims, 2 Drawing Sheets

TREATMENT OF SOLID CONTAINING MATERIAL DERIVED FROM EFFLUENT OR WASTE FROM WASTEPAPER TREATING PROCESS

BACKGROUND OF THE INVENTION

1. Field of the Invention

The present invention relates to the treatment of solid containing material derived from effluent, especially to recover useful materials therefrom.

In particular, this invention is concerned with a method for recovering useful materials from what has hitherto been regarded as the waste material produced by an industrial plant for treating paper, especially for de-inking waste paper.

2. Description of the Background Art

Paper and paperboard products are generally made by preparing a dilute aqueous suspension containing cellulosic fibres derived from wood or from some other suitable fibrous material, and de-watering the suspension on a moving wire mesh belt to form a sheet material. The suspension may also contain a proportion of a mineral filler material which improves the brightness and opacity of the finished paper or board. Natural cellulosic fibrous materials are generally expensive, and the trees or other plants from which they are obtained must be replaced if the balance of the environment is not to be disturbed. It is therefore desirable to incorporate in the aqueous suspension from which the sheet material is made a substantial proportion of cellulosic fibrous material which has been recovered from waste paper. Most waste paper which is recycled has been printed on at least one of its surfaces, and it is necessary to separate the printing ink residue from the cellulosic fibres if the recovered material is to be suitable for use as a starting material in a paper making process. If the ink is not separated, the fibrous material will generally be unacceptably dark in colour. Generally, printing ink contains elemental carbon (carbon black) which causes the dark colouration.

Commercially operated processes for de-inking waste paper generally comprise a pulping stage in which the waste paper is subjected to mechanical agitation in water which also contains sodium hydroxide which causes the fibres to swell, and which breaks down most ink vehicles by saponification or hydrolysis, sodium silicate which acts as a pH buffer and agglomerates detached ink particles to a convenient size, and a surfactant which wets the ink particles and helps to keep them in suspension. The suspension formed in the pulper is passed through a primary screening system in which heavy foreign bodies, such as staples, paper clips and pieces of grit are removed. The suspension passing through the screens is then fed to a treatment plant comprising one or more froth flotation cells, or one or more washing units, or a combination of washing units and flotation cells. The froth flotation cells are each provided near the bottom with a rotating impeller and means for admitting air under pressure in the form of fine bubbles in the region of the impeller. It may also be advantageous to add to the suspension, before it enters the flotation cell, a reagent known as a collector which attaches itself preferentially to the ink particles and increases their affinity with air relative to that with water. As a result, the ink particles are preferentially lifted by the air bubbles to the surface of the suspension in the flotation cell, where they are discharged in a froth product.

In the washing units the pulp is subjected to agitation in fresh or recycled water, optionally containing a dispersing agent, and the washed pulp is then drained on a screen of aperture size such as to retain the relatively long cellulosic fibres, while allowing to pass the mineral and organic particles and the fine fibre fragments.

The suspension which is discharged from the bottom of the flotation cell, and/or the suspension which passes the screens of the washing steps, is de-watered and the de-watered material, which consists of substantially de-inked cellulosic fibre material, may be subjected to further purification steps before being finally de-watered and dried for re-use in a sheet forming process.

The treatment plant reject, which is often in the form of an effluent suspension comprising the froth product from a flotation stage and/or the suspension passing the screens of a washing unit, generally contains, in addition to the ink particles, a substantial proportion of the inorganic filler particles which were originally present in the waste paper. These filler particles usually consist predominantly of a mixture of kaolin clay and calcium carbonate in various proportions, although other inorganic filler particles such as talc, calcium sulphate or titanium dioxide may also be present in minor proportions. Hitherto, this treatment plant reject has had to be discarded as waste because of its very dark colour as a result of its high content of printing ink residues. There has therefore been a loss to the paper maker of potentially useful inorganic filler material. Also the paper maker has had to meet the expense of disposing of the treatment plant reject in a manner which has no undesirable effects on the environment.

It is an object of this invention to provide a process which will make it possible to treat the reject from a waste paper processing or de-inking plant in an economical manner, and, at the same time, make it possible to recycle the inorganic particulate content of the reject for use in a paper making process or in other suitable applications.

Prior art processes for the heat treatment of de-inking sludge waste are described in U.S. Pat. No. 3,320,076 and U.S. Pat. No. 3,765,921. In both processes the ash obtained from the heat treatment process is essentially calcined clay. Both processes would be unsuitable for heat treatment of a material comprising or obtained from paper de-inking waste comprising a substantial quantity of calcium carbonate.

International Patent Publication No. WO95/18886 (F.L. Smidth & Co.) describes a process in which a filler for paper making is recovered from paper sludge.

Insofar as the process described in WO95/18886 is applied to treat a paper waste containing calcium carbonate the product produced thereby would suffer from abrasiveness problems as described hereinafter and would not be useful in applications where non-abrasiveness is required.

SUMMARY OF THE INVENTION

The purpose of the present invention is to provide a process which is suitable for heat treatment of a material comprising or obtained from paper waste treatment plant, eg. a plant for de-inking waste, to convert the inorganic content of such material to a form suitable for re-use as an inorganic particulate material, eg. for coating or filling paper or other products which process is suitable for producing a particulate product without excessive bacicity and abrasiveness as described hereinafter and thereby useful in a variety of applications, especially where product particle non-abrasiveness is required.

DETAILED DESCRIPTION OF THE INVENTION

Figure 1:
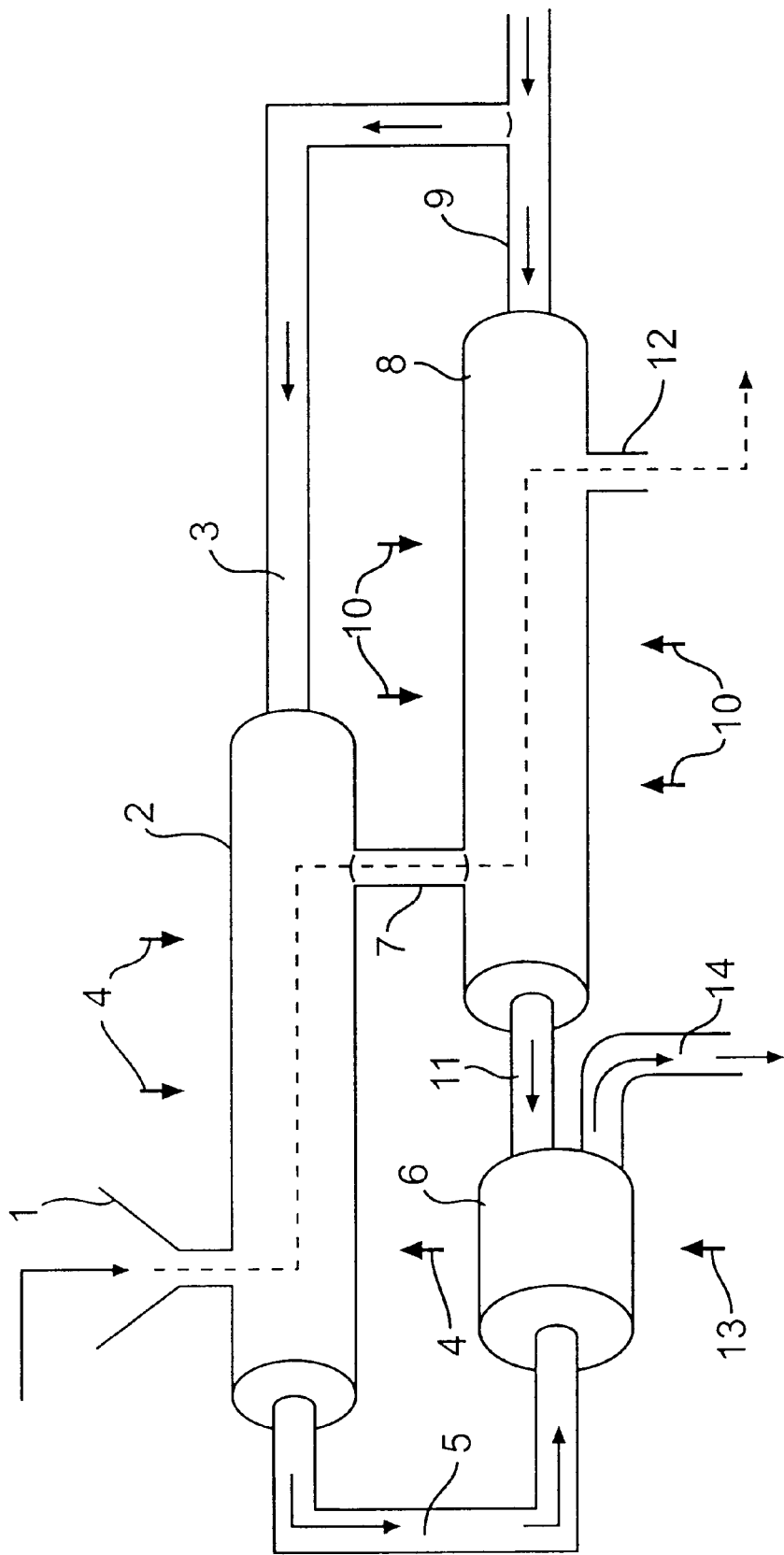
FIG. 1 is a diagrammatic sketch showing an arrangement of apparatus for carrying out a heat treatment method used in a process embodying the invention.

According to the present invention in a first aspect there is provided a method for treating solid-containing material contained in or produced from waste paper or an effluent from a plant for treating paper or paper waste, the solid-containing material including organic material and inorganic particulate material, the method comprising subjecting the solid-containing material to a heat treatment which incinerates the organic material present and forms a calcined product from the inorganic particulate material present and characterised in that the calcined product is formed into an aqueous suspension which includes a salt-forming cationic species and a reagent which contains or generates a salt-forming anionic species is added to the suspension to form an insoluble salt precipitate therein.

The calcined product may include amongst other things basic compounds formed during the calcination process. For example, calcium oxide may be formed by the decomposition of any calcium carbonate present in the inorganic particulate material of the solid-containing material. Such basic material may provide a cationic salt forming species, eg. calcium ions, when suspended in water. Alternatively, or in addition, a reagent providing a cationic salt forming species, eg. an alkaline earth metal hydroxide, eg. calcium or magnesium hydroxide, may be added to the suspension.

The reagent providing or convertible into an anionic salt-forming species is conveniently a carbon dioxide-containing fluid although it may also comprise a suitable soluble salt, eg. sodium carbonate, which produces an insoluble salt by precipitation with the cationic salt forming species, eg. alkaline earth metal cations.

The precipitate formed preferably comprises one or more alkaline earth metal carbonates, especially calcium carbonate, although it could comprise one or more of aluminium phosphate, magnesium phosphate, calcium phosphate, calcium silicate and aluminum silicate. Each of these may be precipitated by reaction of suitable reagents.

The precipitate produced may be obtained in a form in which it is mixed or aggregated together with other inorganic particulate material obtained following the calcination treatment. For example, the particulate material of the solid-containing material treated by the method may include any of the inorganic particulate materials employed in paper making, eg. clay such as kaolin or metakaolin, calcium carbonate, calcium sulphate, mica, titanium dioxide, talc and the like. Kaolin and calcium carbonate are likely to be the main ingredients. Calcium carbonate may be converted into calcium oxide by the calcination treatment. However, as described below, steps may be taken to ensure that none or only a small fraction of the calcium carbonate present is converted into calcium oxide.

The calcined product produced in the method according to the present invention may be treated, after and/or before, preferably at least before, the precipitate formation, by comminution, eg. grinding. Comminution before precipitation helps the production of particles which when mixed or aggregated with or entrained into the particles of the precipitate provides a product which with or without further processing and/or with or without addition to other materials is suitable for use in an application known for fine particulate inorganic material, eg. one of the applications specified below.

The present invention is applicable to treat material contained in or produced from waste paper, eg. cuttings or rejects from paper using processes or alternatively to treat effluent from a plant for the de-inking of waste paper, particularly wherein the material to be treated contains a substantial quantity of calcium carbonate. By "a substantial quantity" is meant at least 5% and up to 100% calcium carbonate by weight relative to the total weight of the inorganic content of the solid material in the material treated.

Where a material containing calcium carbonate is heat treated at a temperature substantially above 800° C. significant decomposition of the calcium carbonate present to calcium oxide takes place. When calcium oxide is in a mixture with clays and other inorganic materials at high temperatures it forms glassy composites and/or particles having serious abrasiveness. We have found that the presence of calcium oxide in materials to be converted into products to be used as particulate pigment, coating, filler and extender materials is therefore undesirable, especially where the particulate material is required for use in paper coatings and fillers and the like wherein a non-abrasive material is required, eg. to avoid harm to machinery employed to process or apply such materials.

Furthermore, if particulate materials for use in the applications as aforesaid include significant quantities of basic materials such as alkaline earth metal oxides, eg. calcium oxide, a deleterious effect on pH of the material when being processed in an aqueous medium is caused and the dispersant salts normally employed in the processing also suffer. The presence of such basic materials in the product formed by the method according to the present invention is therefore desirably minimised. This may be achieved by minimising the amount of basic material formed by the heat treatment and/or by ensuring that the basic material is converted to a precipitate such as calcium carbonate which does not present the same problems as the basic material and which in addition can surprisingly provide advantageous properties.

The formation of alkaline earth metal oxides, eg. calcium oxide, by the heat treatment in the method according to the first aspect of the present invention may therefore be minimised and such minimisation may be achieved by control of temperature as described hereinafter and as claimed by the present Applicants in a copending Patent Application U.S. Ser. No. 08/822,420 filed Mar. 21, 1997 now U.S. Pat. No. 5,846,378 . However, where some or all of the calcium carbonate present in the material treated is allowed to be decomposed to calcium oxide the present invention allows such decomposed material, preferably following a comminution step, to be converted to calcium hydroxide in an aqueous medium and then to a precipitate, eg. calcium carbonate, by introduction of a suitable anion forming reagent, eg. carbon dioxide.

These conversions allow a more useful, non-abrasive form of material, ie. precipitated calcium carbonate, having reduced bacicity to be produced together with other useful particulate inorganic material present, eg. metakaolin and other materials as specified above.

In the method according to the present invention the material to be treated may be obtained by de-watering an aqueous suspension obtained as an effluent from a plant for de-inking paper waste so that the dry weight of solid material present in the suspension is at least 20% by weight of the material to be treated. The material to be treated could have a solids content at any level above this concentration but since the de-watering required to achieve high solids concentrations is time consuming and costly solids concentrations having a dry weight of solid material in the range 20% to 50% by weight are preferred (the remaining constituent of the material being water possibly with minor liquid additives).

The de-watering may be carried out by one or more known processes, eg. evaporation, filtration or centrifuging.

The heat treatment process in the method according to the present invention may be carried out in one of several different ways, eg. using one or more suitable vessels, eg. a furnace and/or a kiln. A fluid bed furnace is preferred in at least part of the process. Where the process comprises a two-stage process as described hereinafter, the different stages may be carried out in the same vessel or in different vessels.

Where the same vessel is used in one or more stages the material treated may be subject to multiple passes through the vessel by a suitable recycling procedure.

In a preferred form of carrying out the method according to the first aspect of the present invention for treating reject sludge produced by a de-inking plant the sludge containing organic material and carbonaceous material (eg. carbon black) as well as calcium carbonate and other particulate material such as kaolin or one of the other materials specified hereinbefore the heat treatment is such that the temperature is controlled to be maintained in the range 600° C. to 750° C. to cause burning of the organic material and the carbonaceous material without decomposition of more than 25% by weight, preferably less than 10% by weight, of the calcium carbonate present to produce a particulate calcium carbonate-containing inorganic material substantially free of organic material and of carbonaceous material.

Material obtained as waste from a paper processing or de-inking plant contains substantial quantities of organic matter which is readily combustible and it is desirable (for the reasons given above) in the method according to the present invention not to allow the heat generated by combustion of the organic matter to raise the temperature substantially above 750° C. This may be achieved either by choosing a process in which the conditions of operation are chosen so that the temperature will not rise above 750° C. and/or by monitoring the temperature of the process and adjusting the conditions of the process to reduce the heat produced if the temperature exceeds a safe level approaching 750° C.

The heat treatment process in the method according to the present invention may comprise a process having two or more heat treatment stages, herein called a "two-stage" process, comprising a first stage in which organic compounds are burned in a manner such that measures are taken to prevent localised temperatures exceeding 750° C.; and a second stage after the organic compounds present have been burned (or at least sufficient of them have been burned to eliminate substantially their heat generating capacity), in which any residual carbonaceous material is burned.

In the second stage, the avoidance of temperature increases arising locally from heat of combustion is not required. For example, the two-stage process may include a first stage in which the delivery rate and temperature of air introduced to burn the organic compounds present are suitable to maintain the temperature below 750° C. Alternatively, the two-stage process may include a first stage in which the material treated is heated in a limited supply of oxygen to burn organic compounds present. This may be followed by a second stage in which the material treated is heated in an excess supply of oxygen to burn any residual carbonaceous material present.

In the first stage of such two-stage processes the organic compounds present in the treated material are burned in a controlled manner to remove the heat-producing potential of such compounds without causing a runaway temperature increase. The second stage is provided to burn residual carbonaceous material which may be present and thereby remove black colouration from the material treated. Desirably, the material formed after heat treatment is a white powder or particulate material.

A first example of a method embodying the invention which is a method which may be used for carrying out the first stage of the two-stage heat treatment process is as follows.

A cake of moist solid material is introduced into a kiln or furnace with a limited supply of oxygen-containing gas, and the kiln or furnace is heated to a temperature which is controlled to within the range from 600° C. to 750° C., preferably from about 650° C. to about 750° C., and most preferably from about 680° C. to 720° C., for a time such that the organic components decompose into volatile gases, and are removed leaving the mineral components of the solid material mixed with a small quantity of carbonaceous material.

In the case of the said first method volatile gases may be evolved from the solid material which contain harmful compounds, such as tars and carbon monoxide, and these may advantageously be destroyed by passing the volatile gases through a second kiln or furnace which is at a temperature of at least 900° C., which is the temperature which is just sufficient to decompose any malodorous or otherwise undesirable compounds.

A second example of a method embodying the present invention which is a method which may be used for carrying out the first stage of the two-stage heat treatment process is as follows.

A cake of moist solid material is burned in a fluidised bed furnace at a temperature which is controlled to be maintained within the range from 600° C. to 800° C., preferably about 600° C. to about 750° C., and most preferably to about 680° C. to 720° C., in which case the organic components of the solid material are substantially completely burned to harmless compounds, leaving the mineral components of the solid material mixed with a small quantity of carbonaceous material. The temperature in the furnace may be controlled during the burning process by suitable adjustment of the air flow rate applied.

The said second method for carrying out the first stage may suitably be carried out in a fluidised bed furnace of the type in which a fluid bed of the rotary or toroidal type is formed eg. wherein a ring shaped chamber having a fixed ring of angled blades is provided and gas is applied between the blades to force the particles into a swirling toroidal motion. Such a bed is for example described in U.S. Pat. No. 4,479,920.

The second stage of the two-stage heat treatment process may conveniently be carried out using a rotary kiln. The temperature in this stage is preferably in the range from about 650° C. to about 750° C., and most preferably from 680° C. to about 720° C.

The temperature maintained in the heat treatment process or in the first stage of a two-stage heat treatment process in the method according to the invention is selected so that the decomposition of organic components proceeds at an acceptable rate but, as noted above, that decomposition of any calcium carbonate present to calcium oxide is preferably minimised.

The material treated by the method according to the present invention may, following the heat treatment process, be allowed to cool. The cooled product will generally comprise a powder or particulate material which may comprise calcium carbonate and clay, eg. kaolin possibly with one or more of calcium sulphate, talc, mica, titanium dioxide and other mineral or inorganic particulate materials. Some of the materials, eg. clays present, may have been converted to a calcined form by the heat treatment process.

The said product is treated by re-suspension in an aqueous solution and the precipitation step is carried out in the suspension preferably preceded by a comminution step. A further comminution step may follow precipitation. The product formed after the precipitation step may be useful with or without further processing and with or without addition to other materials in any of the various applications in which particulate calcium carbonate and/or clay compositions are known to be useful, eg. as compositions for adding as pigments, fillers or extenders for adding to paper, paper coatings, polymers, plastics, paints and the like.

As noted above, the temperatures maintained in the heat treatment process in the method according to the present invention will desirably be insufficient to decompose substantial amounts of any alkaline earth metal compounds which may be present. Any decomposition of alkaline earth metal compounds which does occur will be manifested by an undesirably high pH value of the aqueous suspension, when the product is re-suspended, for example a pH of the order of about 10 to 11. The pH of the suspension may be decreased, if necessary, to below about 9, preferably below about 8, by adding a suitable precipitate-forming reagent, eg. a small quantity of a dilute mineral acid forming an insoluble alkaline earth metal salt in order to form a precipitate. Alternatively, a carbon dioxide-containing fluid may be passed through an aqueous suspension of the product until substantially all of the alkaline earth metal hydroxides present in the suspension have been converted to alkaline earth metal carbonates, and the pH has been reduced to below about 9, preferably below about 8.

When the product obtained following heat treatment and cooling is re-suspended in an aqueous medium, the medium may contain one or more additives, eg. dispersants, antioxidants and the like normally employed in compositions for the aforementioned applications or in materials being processed to form such compositions.

After the calcined product has been re-suspended in an aqueous medium and preferably prior to the precipitation step it may be treated by comminution, eg. by grinding in a manner well known to those skilled in the art, prior to the precipitation step. Such a comminution step, which may be carried out in a known way as described hereinafter, is desirable when the product includes a substantial quantity of basic material, eg. calcium oxide or material formed by reaction with calcium oxide. Such comminution will reduce the abrasiveness of the product and will assist exposure of basic materials, eg. calcium oxide and hydroxide, to water to facilitate subsequent precipitation. The comminution also increases the light scattering coefficient and thus the brightness of the particulate product to be produced. Furthermore, the comminution ensures that a substantially uniform particle size distribution is achieved thereby making the product quality less affected by particle size variations in the minerals present in the original sludge. Without the comminution step the precipitation does not proceed satisfactorily. More anionic species, eg. carbonate produced by carbon dioxide, is required to reach the desired pH. Furthermore, without the comminution unreacted basic material, eg. calcium oxide, not contacted by water and carbon dioxide during the re-suspension and precipitation steps will cause the product pH to rise during storage. The calcium oxide will be bound up in aggregates with the clay and is not easily accessed by water or carbon dioxide. Comminution, as noted above, assists such access.

The product formed by re-suspension and precipitation with or without comminution may be formed in a known way into a suitable composition for use in the application selected, eg. a composition for paper coating or filling. Such product to be used in this way will comprise, in general, precipitate particles formed by the precipitation step mixed or aggregated together with other inorganic particulate material(s) eq. kaolin, calcined kaolin, mica, titanium dioxide and unconverted calcium carbonate.

A paper coating composition may be formed by mixing an aqueous suspension of pigment material comprising the product of the method according to the present invention optionally together with other pigments together with an adhesive. The product employed in the composition may be mixed with one or more other pigments, eg. selected from those specified above. The adhesive may form from 4% to 20% by weight based on the total dry weight of pigment or pigments present. The adhesive may be one of the known paper coating adhesives employed in the art, eg. chosen from the group consisting of starches, proteinaceous adhesives such as casein and lattices of, eg. styrene butadiene rubbers and acrylic polymers. The paper coating composition may also include a thickener, eg. in an amount of up to 2% by weight based upon the total dry weight of pigment or pigments present. The thickener may comprise one or more substances employed as thickeners in the prior art, eg. sodium carboxymethyl cellulose or synthetic acrylic thickeners.

The paper coating composition may be formed by mixing together an aqueous dispersed suspension of the product of the method according to the present invention, optionally with one or more further aqueous dispersed suspensions containing other pigments, with the adhesive and any other optional constituents eg. thickener, in a manner familiar to those skilled in the art.

By use of the method according to the present invention organic materials and darkening components in printing ink, principally elemental carbon (carbon-black), can be removed from paper de-inking waste and inorganic particulate material can be recovered with properties suitable to allow the product to be used as a pigment in paper coating or as a filler in paper or other materials. In particular, a product having acceptable pH in aqueous suspension, brightness, particle size, lack of abrasion, and showing suitable or even improved light scattering, eg. for use as a pigment in paper coating, can be obtained.

When the reject material to be treated by the method of the invention does not contain, or contains only a small amount of, alkaline earth carbonate material, it may be advantageous to add to the suspension formed by re-suspending the product of the heat treatment in an aqueous solution an additional source of alkaline earth metal ions. A suitable source of alkaline earth metal ions is calcium hydroxide, which may be added as such, or may be formed by slaking quicklime in the suspension. Such a precipitation step is suitable for example where precipitated material, eg. calcium carbonate, is required to be added to the particulate product formed after heat treatment to improve its properties, eg. light scattering. Forming such a precipitate in an aqueous suspension of the product particulate material rather than subsequently blending by dry addition of a precipitated material, eg. precipitated calcium carbonate, is beneficial for the following reasons. Firstly, the precipitation step in the method according to the present invention produces together with the fine particles already present small aggregates having improved light scattering properties compared with the free particles making up the aggregates. This improvement is exemplified hereinafter. Secondly, since a carbonator is required to produce precipitated calcium carbonate and one may be used in the method of the present invention where the precipitate is calcium carbonate, production of the precipitate during the method according to the present invention enables production and transport costs to be reduced. Lime to be converted into calcium carbonate is cheaper to transport than precipitated calcium carbonate itself. Nevertheless further precipitated dry material may subsequently be blended with the product if required.

Where the reject material to be treated, conveniently in the form of a cake of moist solid material, is to be heated in a fluidised bed furnace in the heat treatment in the method according to the present invention, the cake of moist solid material may be broken down into pieces of smaller size which are introduced into a fluidised bed which may also contain a heat-resistant particulate solid material. This material should preferably consist of particles which are not larger than about 5 mm and not smaller than about 0.5 mm, and may advantageously comprise silica sand, alumina or a refractory aluminosilicate material which may be formed, for example, by calcining a kaolinitic clay at a temperature above 1150° C., or a mixture thereof.

When in the method according to the first aspect of the present invention the incinerated inorganic material is re-suspended in water to form a suspension preferably the suspension contains from about 5% to about 50% by dry weight of inorganic material.

Where a communition step is applied to an aqueous suspension of the product of the heat treatment in the method according to the first aspect the suspension may be subjected to a milling or grinding process, for example attrition grinding with a particulate grinding medium, to form a fine product. The inorganic material in the suspension is preferably ground until the particle size distribution of the ground inorganic material is such that at least 50% by weight of the particles have an equivalent spherical diameter smaller than 2 μm. In cases where a heat-resistant particulate solid material is used to form a fluidised bed in the heat treatment process, said material may advantageously be used as the particulate grinding medium.

Where the reagent providing an anionic salt-forming species comprises a carbon dioxide-containing gas, the carbon dioxide-containing gas may be substantially pure carbon dioxide or may be present as a mixture of gases such as flue or exhaust gases from a lime kiln or power plant or carbon dioxide mixed with air or nitrogen. The suspension of finely ground inorganic material to which the carbon dioxide is applied may be at ambient temperature, but, when calcium hydroxide is present in the suspension, the production of calcium carbonate in the scalenohedral form is favoured by maintaining the temperature of the suspension in the range from 20% to 65%. The quantity of the carbon dioxide containing gas passed through the suspension is preferably such as to reduce the pH of the suspension to about 7.

Embodiments of the present invention will now be described by way of example with reference to the accompanying drawings.

As shown in FIG. 1, de-watered sludge from a plant for de-inking waste paper is supplied at a dry solids concentration of about 50% by weight to the feed hopper 1 of a first rotary kiln 2 to which air is supplied at a controlled rate through a conduit 3. The temperature within the kiln is maintained in a suitable range, eg. 650° C.–750° C., initially by supplying heat by indirect heating means 4. Thereafter, heat is generated by the chemical decomposition of the organic components present in the sludge, and the temperature is maintained in the same range by controlling the rates of supply of de-watered sludge and air. Substantially all the organic components are converted into gaseous products which pass through a conduit 5 to a direct-fired afterburner 6. The mineral components of the sludge are substantially unaffected and are discharged from the kiln, together with a small quantity of carbonaceous material, through an outlet duct 7 which communicates with a second rotary kiln 8. Excess air is supplied to this kiln through a conduit 9. The temperature in the second rotary kiln is maintained at the same temperature employed in the kiln 2 by controlling heating means 10. Gases are discharged through a conduit 11 to the afterburner 6, and the heat treated product is discharged through an outlet duct 12. The temperature in the afterburner 6 is maintained at a temperature of at least 900° C. by controlling the supply of fuel to a burner 13. The temperature maintained in the afterburner is sufficient to convert any harmful compounds present in the gases passing through conduits 5 and 11, such as carbon monoxide and tars, to harmless substances. Gases are discharged from the afterburner through a conduit 14 to means for recovering heat energy for re-use.

Figure 2:
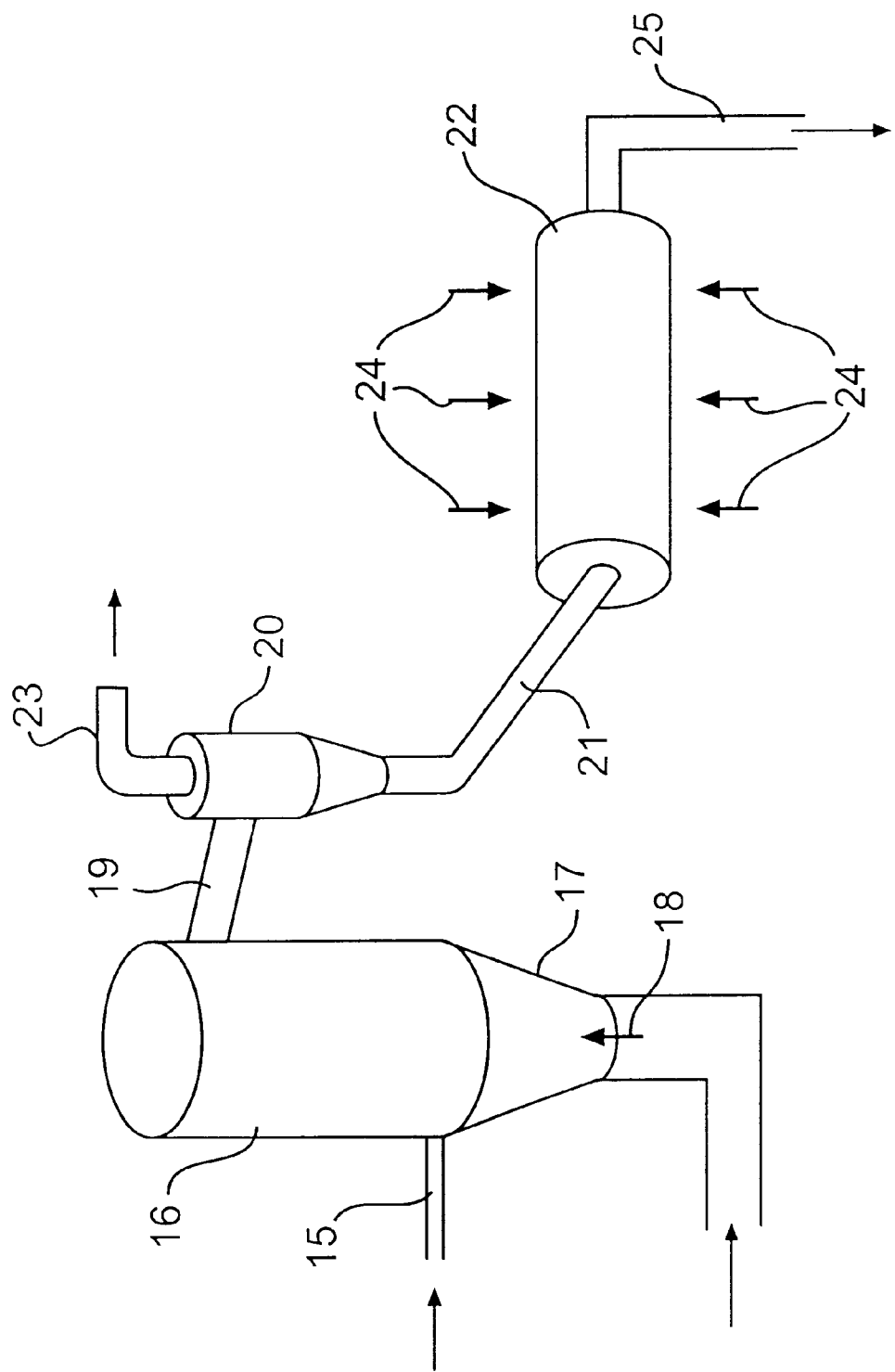
FIG. 2 is a diagrammatic sketch showing a second arrangement of apparatus for carrying out a heat treatment method for use in a process embodying the invention.

As shown in FIG. 2, de-watered sludge from a plant for de-inking waste paper is fed at a dry solids concentration of about 50% by weight through a duct 15 into a fluidised bed furnace 16, to which fluidising air is supplied through a conduit 17. The temperature in the fluidised bed is maintained in a selected range, eg. 650–750° C., initially by heating the fluidising air by burner means 18. Thereafter the chemical decomposition of the organic components of the sludge may generate sufficient heat to maintain the required temperature, or heat may be supplied to the fluidising air as required, the rates of supply of sludge and fluidising air being controlled to keep the temperature at the desired level. The gases and entrained mineral components of the sludge are discharged from the fluidised bed through a conduit 19 to a cyclone separator 20. The mineral components, together with a small quantity of carbonaceous material, are separated from the gases and are discharged from the base of the cyclone through a conduit 21 to a rotary kiln 22. The gases separated by the cyclone separator 20 are discharged through a conduit 23 to means for recovering thermal energy for re-use. The efficiency of the combustion of the organic components in the fluidised bed at a temperature in the range of from 650° C. to 750° C. is found to be such that these gases are substantially free of any harmful compounds. The temperature in the rotary kiln 22 is maintained in the same range as that of the fluidised bed in the furnace 16 by controlling heating means 24. The heat treated mineral components, substantially free of carbonaceous materials are finally discharged through a conduit 25.

The product formed after heat treatment using the apparatus of FIG. 1 or FIG. 2 is cooled and then subjected to grinding and precipitation processes as in the following Examples.

EXAMPLES

Examples of the treatment processes described above with reference to FIGS. 1 and 2 and further treatment and investigation of the products obtained thereby are as follows.

Example 1

Sludge from the de-inking plant attached to a tissue paper mill was dewatered by means of a belt press to form a cake containing approximately 50% by weight of solids. The approximate composition of the solids was 45% by weight calcium carbonate, 25% by weight of other minerals, principally kaolin clay, and 30% by weight of combustible organic matter. The cake was dried and milled in a Raymond Mill to a coarse powder.

The coarse powder was fed to a fluidised bed calcining furnace of the type specified in British Patent Specification No. 1361402. A fluidised bed had first been established in the furnace using as the fluidising medium silica sand particles of diameter in the range of from 1 mm to 2 mm, and a temperature of 900° C. was maintained in the furnace. Part of to the product resulting from incineration in the fluidised bed remained in the bed, and part was carried out of the bed by the fluidising gas and was separated from the gas by means of a cyclone. After a quantity of the waste powder had been incinerated, the bed material containing the incinerated product was raked from the bed and cooled. This material was then mixed with the solid material separated from the fluidising gas stream by the cyclone and the mixture was suspended in water to form a suspension containing 30% by weight of total solid material. This suspension was then subjected to attrition grinding in a vessel provided with an impeller, the sand particles from the fluidised bed acting as the attrition grinding medium. The attrition grinding step was continued for a time sufficient to dissipate in the suspension 250 kWh of energy per tonne of dry solid material in the suspension (900 KJ $kg^1$). On completion of the grinding the alumina particles were separated from the suspension of the ground product on a sieve of aperture size 0.25 mm. A gas mixture comprising 25% by volume of carbon dioxide, the remainder being air, was passed through the suspension until the pH of the suspension fell to 7.0. The resultant suspension which contained an aggregated crystalline precipitate was pumped through a hydraulic cyclone to remove a small fraction of particles having a diameter larger than 10 $\mu$m, and the remaining fine particles were separated from the aqueous medium by filtration and dried. The dry material could be recycled to a paper mill for use as a filler.

Example 2

Sludge from the tissue paper mill described in Example 1 was dewatered to form a cake of 50% solid material, shredded into pieces of approximately 0.5 cm in diameter and dried. This material was then fed into a toroidal fluidised bed furnace operating at 750° C. After the material had been incinerated the bed was discharged and the material suspended in water forming a slurry of 20 wt % solids. Analysis of this material showed that approximately 40% of the original calcium carbonate had decomposed to calcium oxide. Sand particles of diameter 1 mm to 2 mm were then added to the slurry and the resultant mixture was subjected to attrition grinding in a vessel provided with an impeller. The attrition grinding step was continued for a time sufficient to dissipate in the suspension of 250 kWh of energy per tonne of dry solid material in the suspension (900 KJ $kg^1$). On completion of the grinding the sand particles were separated from the suspension of the ground product on a sieve of aperture size 0.25 mm. A gas mixture comprising 25% by volume of carbon dioxide, the remainder being air, was passed through the suspension until the pH of the suspension fell to 7.0. The suspension was then dewatered and dried. Analysis of the resultant material showed it to consist of approximately 80% by weight of particles less than 2 $\mu$m equivalent spherical diameter. The measured Einlehner abrasion of the material was 26 $gm^{-2}$.

Example 3

Sludge was processed by the same procedure as described in example 2, with the exception that the fluidised bed furnace was operated at 850° C. The calcium carbonate contained in the original sludge material was totally converted to calcium oxide during the combustion step.

Analysis of the final material produced showed it to consist of approximately 70% by weight of particles less than 2 $\mu$m equivalent spherical diameter. The measured Einlehner abrasion of the material was 52 $gm^{-2}$.

Example 4

Sludge was processed by the same procedure as described in example 2, with the exception that the fluidised bed furnace was operated at 950° C. The calcium carbonate contained in the original sludge material was totally converted to calcium oxide during the combustion step. Analysis of the material produced showed it to consist of approximately 90% by weight of particles less than 2 $\mu$m equivalent spherical diameter. The measured Einlehner abrasion of the material was 70 $gm^{-2}$.

Example 5

Sludge from the tissue paper mill described in example 1 was dewatered to form a cake of 50% by weight solid material, and shredded into pieces of approximately 0.5 cm in diameter. This material was then fed into a toroidal fluidised bed furnace operating at 650° C. Material was collected from a cyclone situated in the air outlet duct of the furnace, and further calcined at 650° C. in a rotary kiln to remove a small amount of residual carbon char and improve its colour. Analysis of the material recovered at this stage showed that 10% by weight of the calcium carbonate contained in the original sludge material had been converted to calcium oxide. The material was then suspended in water to form a slurry of 20 wt % solids and processed as in example 2, with the exception that the attrition grinding was terminated after 100 kWh per tonne of grinding energy had been dissipated in the slurry. Analysis of the material produced showed it to consist of approximately 90% by weight of particles less than 2 $\mu$m equivalent spherical diameter. The measured Einlehner abrasion of the material was 31 $gm^{-2}$.

Example 6

A combined sludge from the de-inking and pulping plants attached to a newsprint mill was dewatered by means of a belt press to form a cake containing approximately 50% by weight of solids and shredded into pieces of approximately 0.5 cm in diameter. The approximate composition of the solids was 14% by weight calcium carbonate, 26% by weight of other minerals, principally kaolin clay, and 60% by weight of combustible organic matter. The material was fed into a fluidised bed furnace of the above described toroidal kind operating at 700° C. The product from this step was then further calcined at 700° C. to remove residual carbon char. Analysis of the material produced at this stage showed that 25% of the original calcium carbonate had decomposed to calcium oxide. The material was then slurried in water and processed as in example 5. Analysis of the material produced showed it to consist of approximately 90% by weight of particles less than 2 μm equivalent spherical diameter. The measured Einlehner abrasion of the material as 52 gm$^{-2}$. The ISO brightness value of the material was 70.6%.

The material was added to a paper pulp, which had been prepared by the sulphite process, and the resultant mixture was formed into sheets containing 25% by weight of the inorganic material. By comparison with sheets made from the pulp alone, the Kubelka-Munk light scattering coefficient (as commonly used in the paper industry) of the composite sheets was raised from 250 cm$^2$/g to 800 cm$^2$/g. The effective light scattering coefficient of the inorganic material can thus be calculated to be approximately 2500 cm$^2$/g. By comparison, a typical clay or chalk pigment used for paper filling would have a light scattering coefficient of approximately 1500 cm$^2$/g, and a finer clay or ground marble pigment, such as those used in paper coating, would have a light scattering coefficient of 2000 cm$^2$/g under the same conditions. This demonstrates the unexpected beneficial light scattering obtained from the precipitation step in the method of according to the present invention.

Example 7

Sludge was processed as in example 6, with the exception that calcium hydroxide was added to the sample before passing the carbon-dioxide containing gas through the slurry. The quantity of calcium hydroxide was sufficient to double the mass of the final product relative to the situation in which no calcium hydroxide was added. Analysis of the material produced showed it to consist of approximately 70% by weight of particles less than 2 gm$^{-2}$ equivalent spherical diameter. The ISO brightness value of the material was 75.5%.

What is claimed is:

1. A method of treating solid containing material contained in or produced from an effluent or waste from a process for the treating of waste paper, the solid-containing material comprising constituents of the waste paper and including organic material including cellulose fibres and inorganic particulate material including calcium carbonate and other inorganic particulate material included in the waste paper, the method including the steps of subjecting the solid-containing material to a heat treatment which incinerates the organic material present and forms from the inorganic particulate material present a calcined product including calcium oxide from thermal decomposition of calcium carbonate; forming the calcined product into an aqueous suspension wherein the calcium oxide is converted to calcium hydroxide; applying comminution to the calcined product in the said aqueous suspension; and adding to the suspension a reagent which forms a salt-forming anionic species to form in the suspension an insoluble calcium salt precipitate mixed or aggregated with other inorganic particulate material derived from the waste paper constituents.

2. A method as in claim 1 and wherein the solid-containing material treated including said calcium carbonate is heat treated and wherein the said reagent comprises carbon dioxide whereby the precipitate comprises calcium carbonate.

3. A method as in claim 2 and wherein the temperature in the heat treatment is controlled to be maintained in the range 600° C. to 750° C. and not more than 25% by weight of the calcium carbonate present in the solid-containing material treated is decomposed by the heat treatment.

4. A method as claimed in claim 1 and wherein the solid containing material treated comprises material obtained as a waste, or produced from such a waste, from a paper de-inking plant and wherein the organic material and the carbonaceous material present in the treated material substantially all burned by the heat treatment to produce a calcined product which is substantially white.

5. A method as claimed in claim 4 and wherein the first stage is carried out in an vessel providing a fluidised bed in which the delivery of air is controlled to control the temperature of the heat treatment.

6. A method as claimed in claim 1 and wherein the comminution comprises attrition grinding with a particulate grinding medium to form a fine product such that at least 50% by weight of the particles have an equivalent spherical diameter less than 2 μm.

7. A method as claimed in claim 1 and wherein the heat treatment process is applied in two or more stages wherein in a first stage organic compounds are burned in such a manner that the temperature is not allowed to exceed 750°C.

8. A method as claimed in claim 7 and wherein in a second stage following directly or indirectly after the said first stage residual carbonaceous material is burned.

9. A method as claimed in claim 8 and wherein the said first stage is carried out in a vessel in which a limited air supply is delivered.

10. A method as claimed in claim 9 and wherein gaseous compounds evolved from the burning of organic compounds present in the material treated are conveyed to another vessel in which such gaseous compounds are decomposed at a higher temperature.

11. A method as in claim 10 and wherein the fluidised bed is of the rotary or toroidal kind.

12. A method as claimed in claim 1 and wherein the said second stage is carried out in a rotary kiln with an excess supply of oxygen.

13. A method as claimed in claim 1 and wherein the material to be treated is prepared by de-watering an aqueous suspension obtained as an effluent from a plant for de-inking paper waste.

14. A method as claimed in claim 1 and wherein an alkaline earth metal hydroxide is added to the calcined product and a precipitate is formed by addition of carbon dioxide to the added hydroxide.

15. A method of claim 1 and wherein the comminution applied to the calcined product in the aqueous suspension comprises a milling or grinding process.

16. A method as claimed in claim 1 and wherein said reagent which forms a salt forming ionic species comprises carbon dioxide and addition of the carbon dioxide is continued until substantially all of the alkaline earth metal hydroxides present in the aqueous suspension have been converted to alkaline earth metal carbonates.

17. A method as claimed in claim 1 and wherein the material treated in the heat treatment has been de-watered to give a solids concentration in the range 20% to 50% by weight, the remaining constituents of the material being water optionally with minor liquid additives.

18. A method as claimed in claim 1 and wherein said other inorganic particulate material in the treated solid-containing material includes kaolin.

* * * * *